United States Patent [19]

Muramatsu et al.

[11] Patent Number: 5,339,396
[45] Date of Patent: Aug. 16, 1994

[54] INTERCONNECTION NETWORK AND CROSSBAR SWITCH FOR THE SAME

[75] Inventors: Akira Muramatsu, Kawasaki; Ikuo Yoshihara, Tama; Kazuo Nakao, Sagamihara; Takehisa Hayashi, Kodaira; Teruo Tanaka; Shigeo Nagashima, both of Hachioji, all of Japan

[73] Assignee: Hitachi, Ltd., Tokyo, Japan

[21] Appl. No.: 119,601

[22] Filed: Sep. 10, 1993

Related U.S. Application Data

[63] Continuation of Ser. No. 780,420, Oct. 22, 1991, abandoned, which is a continuation of Ser. No. 272,528, Nov. 17, 1988, abandoned.

[30] Foreign Application Priority Data

Nov. 18, 1987 [JP] Japan .................. 62-289323

[51] Int. Cl.$^5$ ............................................. G06F 13/00
[52] U.S. Cl. .................................. 395/325; 395/200; 395/800; 364/DIG. 1; 364/229; 364/240.7; 364/284; 364/284.3; 364/940.61
[58] Field of Search ............ 395/325, 200, 800; 370/60, 66, 85.1

[56] References Cited

U.S. PATENT DOCUMENTS

| | | | |
|---|---|---|---|
| 4,514,807 | 4/1985 | Nogi ..................... | 395/800 |
| 4,811,210 | 3/1989 | McAulay ............... | 364/200 |
| 4,918,686 | 4/1990 | Hayashi et al. ....... | 370/60 |
| 4,943,909 | 7/1990 | Huang .................. | 364/200 |
| 5,021,947 | 6/1991 | Campbell et al. .... | 364/200 |
| 5,038,386 | 8/1991 | Li ......................... | 395/800 |

FOREIGN PATENT DOCUMENTS

| | | |
|---|---|---|
| 57-111654 | 7/1982 | Japan . |
| 59-109966 | 6/1984 | Japan . |
| 60-151776 | 8/1985 | Japan . |
| 63-124162 | 5/1988 | Japan . |

OTHER PUBLICATIONS

"The Multistage Cube: A Versatile Interconnection Network" written by Siegel et al., IEEE Computer, Dec. 1981. pp. 65–76, vol. 14, No. 12.

(List continued on next page.)

Primary Examiner—Eddie P. Chan
Attorney, Agent, or Firm—Fay, Sharpe, Beall, Fagan, Minnich & McKee

[57] ABSTRACT

In a parallel computer including $L = n_1 \times n_2 \times \cdots \times n_N$ processor element or external devices (hereafter represented by processor elements), an interconnection network of processor elements using $L \times (1/n_1 + 1/n_2 + \cdots + 1/n_N)$ crossbar switches in total comprises N dimensional lattice coordinates $(i_1, i_2, \ldots, i_N)$, $0 \leq i_1 \leq n_1{-}1$, $0 \leq i_2 \leq n_2{-}1$, $\ldots$, $0 \leq i_n \leq n_{N}{-}1$ given to each processor element as the processor element number, crossbar switches for decoding a dimensional field in a processor element number having specific position and length depending upon the number of lattice points of a particular dimension and for performing the switching operation with regard to the dimension, interconnection of $n_k$ processor elements having processor element numbers, which are different only in the k-th dimensional coordinate for arbitrary k, i.e., having processor element numbers $$(i_1, i_2, \ldots, \overset{k}{0}, \ldots, i_N)$$
$$(i_1, i_2, \ldots, 1, \ldots, i_N)$$
$$\ldots$$
$$(i_1, i_2, \ldots, n_k{-}1, \ldots, i_N)$$

by using one of the crossbar switches, each of the crossbar switches having $n_k$ inputs and $n_k$ outputs, and the interconnection performed with respect to all ($L/n_k$ sets) of coordinates $$(i_1, i_2, \ldots, n_{k-1}, n_{k+1}, \ldots, i_N)$$

of N-1 dimensional subspace excluding the k-th dimension, the interconnection being further performed for all values of k ($1 \leq k \leq N$).

4 Claims, 12 Drawing Sheets

OTHER PUBLICATIONS

"A Survey of Interconnection Networks" written by Feng et al., IEEE Computer, vol. 14, No. 12, pp. 12–27, 1981.

Suzuoka, T., et al. "Toward a Parallel Processing System for AI", 35th (last half year 1987) National Conference of Information Processing Society of Japan, Sep. 1987, pp. 135–136. (English translation of Japanese Document previously submitted.)

C. L. Seitz, "The Cosmic Cube", Communication of the ACM, vol. 28, No. 1, 1985, pp. 22–33.

Dharma P. Agrawal et al., "Evaluating the Performance of Multicomputer Configurations", May 1986, pp. 28–29.

EXAMPLE OF FIRST DIMENSIONAL
COORDINATE TRANSFORMING
CROSSBAR SWITCH
(VALUES OF j AND K ARE ARBITRARY)

INTERCONNECTION NETWORK AND CROSSBAR SWITCH FOR THE SAME

This is a continuation of copending application(s) Ser. No. 07/780,420 filed on Oct. 22, 1991 now abandoned which is a File Wrapper continuation of Ser. No. 07/272,528 filed on Nov. 17, 1988 (abandoned).

CROSS-REFERENCE TO RELATED APPLICATION

The present application relates to U.S. patent application Ser. No. 07/224,894 filed on Jul. 27, 1988 now U.S. Pat. No. 4,918,626 and entitled "Data Transfer Network Suitable for Use in Parallel Computer", by Takehisa Hayashi, Koichiro Omoda, Teruo Tanaka, Naoki Hamanaka and Shigeo Nagashima, assigned to the present assignee, based on Japanese Patent Application No. 62-185479 filed on Jul. 27, 1987.

BACKGROUND OF THE INVENTION

The present invention relates to an interconnection scheme of processor elements of a parallel computer, and in particular to a switch configuration suitable to the case where high interconnection capability is needed but all processors cannot be connected by a full crossbar switch because the number of processors is large.

In a typical method of the prior art, respective processor elements are connected to one bus or several buses. Other representative schemes include a scheme in which adjacent processor elements among processor elements arranged in a lattice form are connected as described in JP-A-60-151776, a scheme in which all processor elements are connected by one or several crossbar switches as described in JP-A-59-109966 and "Toward a parallel processing system for AI", T. Suzuoka, S. Nakamura and S. Oyanagi, 35th (the last half year of 1987) National Conference of Information Processing Society of Japan, Sep. 28, 1987, pp. 135–136, a scheme in which all processor elements are connected by a multistage switch as described in JP-A-57-111654, and a scheme in which hypercube connection is used as described in reference 1.

Reference 1: C. L. Seitz, "The Cosmic Cube", communications of the ACM, vol. 28, no. 1, pp. 22–33, 1985.

Among the above described conventional techniques, the bus connection scheme has an advantage that a small amount of hardware is required, but has a problem that the performance is lowered by competition for buses when the number of connected processor elements is large. It is said that there is a limit of ten and several processor elements.

In the lattice connection (called also as mesh connection), the amount of hardware is similarly small, and a large number of processor elements can be connected. On the other hand, a processor element can communicate with only adjacent processor elements, and hence the overall communication performance largely depends upon the property of the problem to be dealt with. The communication performance is fine in a case of derivation of a solution of a partial differential equation and in a case of picture processing suited for neighborhood calculation. In case of the finite element method, fast Fourier transformation (FFT), and logic-/circuit simulation, the overhead for communication becomes significant.

In the full crossbar switch connection, all processor elements are completely connected by a matrix switch. Therefore, the full crossbar switch connection has the highest performance among all connections. Since the amount of hardware is in proportion to the square of the number of processor elements, however, there is typically a connection limit of several tens processor elements.

In case of a multistage switch, the amount of hardware is limited to approximately $L\log_2 L$, where L is the number of processor elements, and complete connection is possible. Therefore, the multistage switch has been regarded as a connection scheme suited for highly parallel computers including a large number of processor elements. However, there is a problem that the numeral length of the communication path (i.e., the number of relaying stages) becomes approximately $\log_2 L$ and hence the transfer delay is accordingly large. There is also the problem that when a large number of processor elements gain access to an identical shared variable, a plurality of access paths must scramble for a communication path on the way and general paralysis of the network, called hot spot contention, can occur (the paralysis extends to all accesses). Yet another problem for the multistage switch is that when the access competition is significant, sufficient performance is still not obtained even if hot spot contention does not occur.

A hypercube connection is known as connection through which relatively efficient communication can be performed. In this case, however, the other party of communication must be specified on the program and hence programming becomes complicated. If an automatic relaying mechanism is disposed for each processor element in order to avoid the complication of programming, the amount of hardware increases. Further, there is a problem that mounting is troublesome because of intersected wiring.

It is known that a specific interprocessor communication pattern often appears in parallel processing of large-scale numerical calculus. The lattice connection, the ring connection and the butterfly connection can be mentioned as representative communication patterns. If communication of these specific patterns can be processed at high speed, therefore, it can be said that the effectiveness of the network is large. Only the full crossbar switch and the hypercube among the above described conventional techniques contain the lattice connection, the ring connection and the butterfly connection have their own connection topologies which enable communication in these patterns without requiring the relaying function. Neither the bus connection, nor the lattice connection, nor the multistage switch is capable of processing all communication of these specific patterns. Further as a special example, a spanning bus hypercube, which is obtained by expanding a binary hypercube based upon the connection of two processor elements into configuration based upon the connection of a plurality of processor elements is described in Reference 2. Since a plurality of processor elements are connected via a bus, however, only two processors can communicate at one time, and hence it is not considered that the spanning bus hypercube contains the above described connection topolygy.

Reference 2: Dharma P. Agrawal et. al., "Evaluating the Performance of Multicomputer Configurations", May 1986, pp. 28–29, 1986.

Among the above described problems, the problem that the number of processor elements connected in the bus connection is limited has not been solved when the number of processor elements is large. Further, both the problem that the performance of the lattice connection largely depends upon the property of the problem dealt with and the problem of hot spot contention in the multistage switch are basic and essential problems and are not solved under the present art. Further, these connections, together with the spanning bus hypercube, have a problem of degraded performance in principal applications caused by the fact that these connections do not contain all of the lattice connection, the ring connection and the butterfly connection.

Two remaining networks, i.e., the (full) crossbar switch and the hypercube are free from the above described difficulties based on principles. On the other hand, in the (full) crossbar switch, the amount of hardware is too large, and hence a large number of processor elements cannot be connected. In the hypercube, a large number of processor elements can be connected, but programming and mounting are troublesome and the performance is also degraded when the number of connected processor elements is increased. Further, if communication is performed between two processor elements which are not directly connected in a hypercube, another processor element must perform the relaying function. Such a communication method of taking an information packet temporarily into a processor element and then transferring the information packet to a different processor element is called a store and forward scheme. Not only the hypercube but also the other store and forward scheme has a problem that a deadlock state may be caused. That is to say, when a loop communication path is formed by a plurality of processor elements $P_1$, $P_2$, $P_3$ - - - to perform relaying function, $P_1$ cannot finish the transmission operation until $P_2$ finishes the transmission operation and is ready to receive the information, $P_2$ cannot finish the transmission operation until $P_3$ finishes the transmission operation and is ready to receive the information, and so on. In this way, the processor elements engage each other and are not able to operate, resulting in the deadlock state.

The performance is evaluated by means of the number of basic changeover switches (cross points) that one unit of transmitted information passes through until it reaches a final destination. The amount of hardware is evaluated by means of the total number of cross points constituting the network. In general, however, the amount of hardware is related to the performance by a trade-off relationship. As the total number of cross points is increased, therefore, the number of cross points through which one unit for transmitted information passes is decreased.

SUMMARY OF THE INVENTION

An object of the present invention is to provide a system configuration having an interconnection network free from the difficulties occurring in the above described systems, which connects processor elements with high connection capability (i.e., with a small number of changeover stages) close to that of the capability of a full crossbar switch when the (technical and financial) upper limit of the amount of hardware and the number of processor elements are arbitrarily given, and which gives optimum connection with respect to the communication performance and the amount of hardware; and, in particular to provide a technique for variably providing a network having the minimum or optimum amount of switch hardware.

That is to say, in the prior art, a network had to comprise a full crossbar switch when the number of processor elements was still small, whereas the network had to comprise a hypercube when the number of processor elements become equal to or larger than a particular value. However, the present invention makes it possible to form many kinds of interconnection networks each of which has intermediate performance between the full crossbar switch and the hypercube, and also has a smaller amount of switch hardware than that of the hypercube to provide a relaying function free from the fear of deadlock. Further, its mounting is suitable from the viewpoint of performance balance and maintenance because unit switches of the network can be mounted within a chip, within a module, within a board, within a cubicle or between cubicles.

The above described object is basically attained in a parallel computer including L processor elements, where L can be resolved into factors as $L = n_1 \times n_2 \times \cdots \times n_N$, by an interconnection network of processor elements using $L \times (1/n_1 + 1/n_2 + \cdots + 1/n_N)$ crossbar switches in total, comprising coordinates $(i_1, i_2, \cdots, i_N)$, $0 \leq i_1 \leq n_1 - 1$, $0 \leq i_2 \leq n_2 - 1$, $\cdots$, $0 \leq i_N \leq n_N - 1$ of an internal point of a hyperrectangular solid on an N dimensional lattice space having each of the above described factors as the number of lattice points of one side, given to each processor element as the processor element number, interconnection of $n_k$ processor elements having processor element numbers, which are different only in the k-th dimensional coordinate for arbitrary k, i.e., having processor element numbers $$(i_1, i_2, \ldots, \overset{k}{0}, \ldots, i_N)$$
$$(i_1, i_2, \ldots, 1, \ldots, i_N)$$
$$\ldots$$
$$(i_1, i_2, \ldots, n_k - 1, \ldots, i_N)$$

by using one crossbar switch having $n_k$ inputs and $n_k$ outputs, the above interconnection performed with respect to all ($L/n_k$ sets) of coordinates $$(i_1, i_2, \cdots, n_{k-1}, n_{k+1}, \cdots, i_N)$$

of N-1 dimensional subspace excluding the k-th dimension, the interconnection being further performed for all values of k ($1 \leq k \leq N$), and relaying means associated with a processor element of transmission side, selecting one noncoincident dimension k ($i_k \neq j_k$) between its own processor element number $(i_1, i_2, \cdots, i_N)$ and the destination processor element number $(j_1, j_2, \cdots j_N)$, selecting a crossbar switch (hereafter referred to as the k-th coordinate transforming crossbar switch) connecting processor elements having processor element numbers, which are different only in the k-th dimensional coordinate out of N crossbar switches associated with the relaying mean of the processor element of the transmission side, and inputting a communication information packet having a set of the destination processor element number and transmission data to the selected crossbar switch, each coordinate transforming crossbar switch decoding the k-th dimensional coordinate portion of the destination processor number and sending the information packet to a processor element having a processor element number equivalent to the destination processor element number in the k-th dimensional coordinate, i.e., the destination processor element itself or a processor element located on a path on the way to the destination processor element so as to be relayed, in the latter case the operation being relayed until disappearance of non-coincident coordinates, the information packet being sent to the destination processor. Further, by using a crossbar switch as relaying means associated with a processor element, competition with other relaying paths at the time of relaying is eliminated. As a result, a fear of deadlock can be completely removed.

It will now be described that communication between arbitrary processor elements can be performed by using the interconnection scheme according to the present invention. It is now assumed that a processor element originating transmission having a processor element number $(i_1, i_2, ---, i_N)$ communicates with a destination processor element having a processor element number $(j_1, i_2, ---, i_N)$. In a case where the first coordinate $i_1$ of the originating processor element is not equivalent to the first coordinate $j_1$ of the destination processor, processor elements having entirely equivalent coordinates with the exception of this coordinate are connected to one crossbar switch (the first coordinate transforming crossbar switch), and hence information can be sent to a processor element having a processor element number $(j_1, i_2, --- i_N)$ or a relaying crossbar switch associated with the processor element by means of that crossbar switch. Succeedingly, the processor element or the relaying crossbar switch associated with the processor element which has received information is connected to a processor element having entirely equivalent coordinates with the exception of the second coordinate by one coordinate transforming crossbar switch. If $i_2 \neq j_2$, therefore, it is possible to send information to a processor element having a processor element number $(j_1, j_2, i_3, --- i_N)$ or a relaying crossbar switch associated with the processor element. By selecting such paths and sending information successively to processor elements having coordinates successively replaced or relaying crossbar switches associated with the processor elements by coordinate transforming crossbar switches, it is finally possible to send information to a processor element having a processor element number $(j_1, j_2, --- j_N)$.

Further, in many cases, it is possible to limit the number of processor elements of each dimension by performing suitably factorization of L. Thereby, it becomes possible to house the coordinate transforming crossbar switch of each dimension in a determined mounting unit such as in a chip, in a module, in a board, in a cubicle or between cubicles. This property cannot be sufficiently achieved under the condition that $L = m^N$ where all factors assume equivalent values. The factorization according to the present invention as $L = n_1 \times n_2 \times --- \times n_N$ becomes the necessary condition for attaining the property.

In case relaying crossbar switches are not used, deadlock may be caused if a processor element $P_1$ is going to relay a packet to a processor element $P_2$ and at the same time the processor element $P_2$ is also going to relay a packet to the processor element $P_1$. If relaying crossbar switches are used, however, the flow of the packet from $P_1$ to $P_2$ can be established independently of the packet flow from $P_2$ to $P_1$, deadlock not being caused.

DESCRIPTION OF THE PREFERRED EMBODIMENT

Embodiments of an interconnection network and a crossbar switch for the same according to the present invention will now be described in detail by referring to accompanying drawings.

Figure 1:
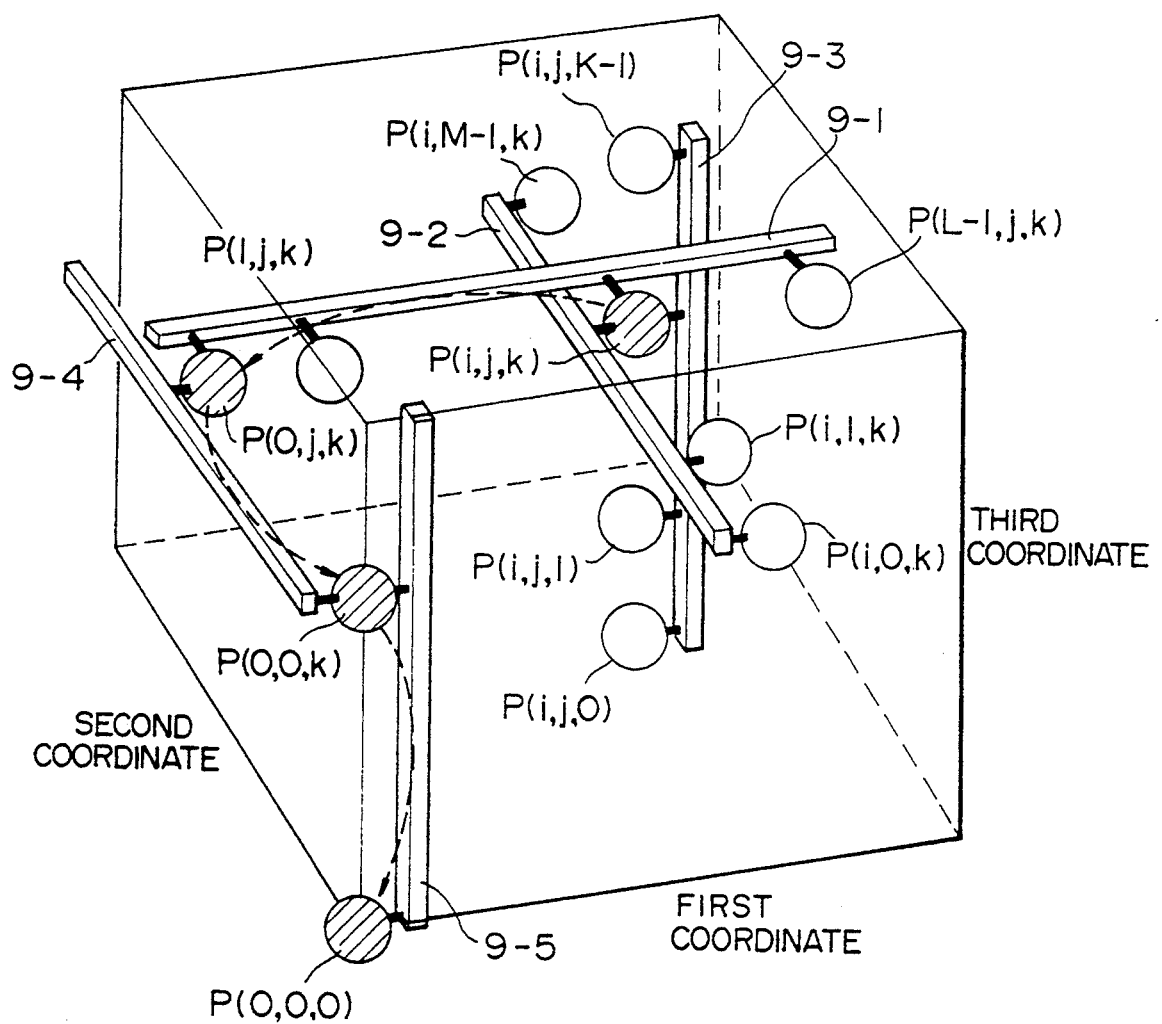
FIG. 1 is a configuration diagram of a first embodiment of an interconnection network according to the present invention.
Figure 2:
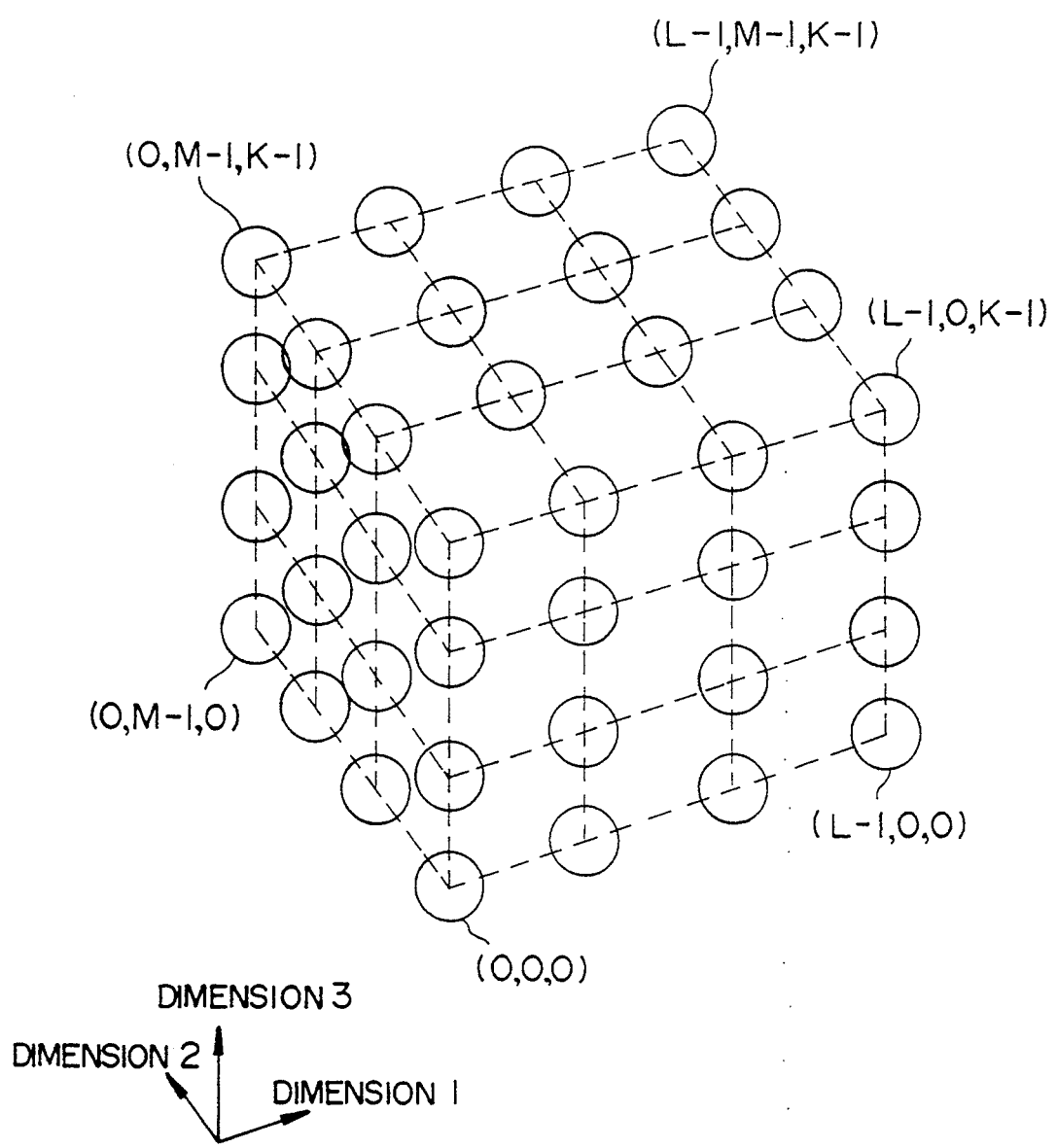
FIG. 2 is an arrangement diagram showing the hyperrectangular solid arrangement of processor elements.

FIG. 1 schematically shows the configuration of a first embodiment of an interconnection network according to the present invention by taking a three-dimensional interconnection scheme as an example. Even if it is expanded into an N-dimensional interconnection scheme, a similar configuration is also used. An arbitrary processor element P(i, j, k) (having a processor elements number (i, j, k)), which is logically disposed at each lattice point corresponding to an internal point of a rectangular solid of L x M x K on a three-dimensional lattice space as shown in FIG. 2 is connected to three crossbar switches 9-1, 9-2 and 9-3. The crossbar switch 9-1 completely connects the processor element P(i, j, k) to processor elements P(o, j, k), P(1, j, k), ---, P(L-1, j, k) having coordinates which are different only in the first dimension from those of P(i, j, k). In the same way, the crossbar switch 9-2 completely connects the processor element P(i, j, k) to processor elements P(i, o, k), P(i, 1, k), ---, P(i, M-1, k) having coordinates which are different only in the second dimension from those of P(i, j, k). Further, the crossbar switch 9-3 completely connects the processor element P(i, j, k) to processor elements P(i, j, o), P(i, j, 1), ---, P(i, j, K-1) having coordinates which are different only in the third dimension from those of P(i, j, k).

Each crossbar switch has a function of making the processor element P(i, j, k) communicate with a processor element having a number obtained by replacing the coordinate value of one particular dimension, which are included in the three dimensional coordinate values defining the processor element number, with another coordinate value. Therefore, this crossbar switch is hereafter referred to as the coordinate transforming crossbar switch. The switch performing the coordinate transformation of a particular dimension k is referred to as the k-dimensional coordinate transforming crossbar switch. As shown later, each of the processor elements can communicate with an other processor element having an arbitrary number via the three coordinate transforming crossbar switches.

Figure 3:
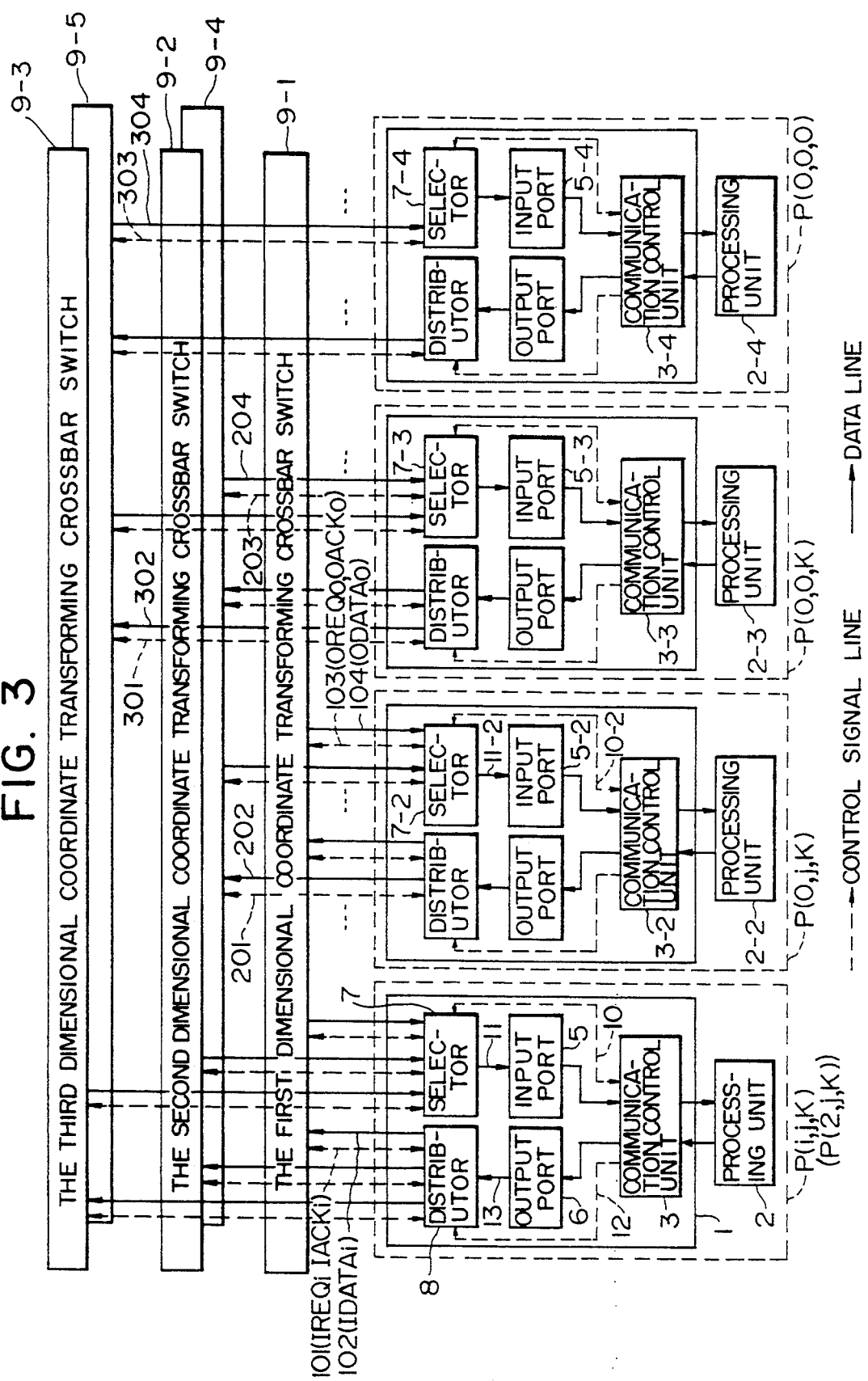
FIG. 3 is a configuration diagram of processor elements.

FIG. 3 shows the structure of a processor element. The processor element P(i, j, k) includes a relaying unit 1 and a processing unit 2, which is a conventional computer having a program counter and which executes instructions sequentially. The relaying unit 1 includes a communication control unit 3, which has a microprogram therein and has the functions of decoding the processor number of destination of a communication packet inputted from the processing unit 2 or an input port register 5, selecting a particular one of the coordinate transforming crossbar switches 9-1 to 9-3 for next receipt of the packet or the processing unit 2 on the basis of the decoded result, and sending the communication packet thereto. The unit also includes an input port register 5 and an output port register 6 for temporarily storing the communication packet, a selector 7 for selecting a one of the input communication paths coming from three coordinate transforming crossbar switches, and a distributor 8 for selecting one of N coordinate transforming crossbar switches as the destination of the communication packet stored in the ouput port. The communication packet includes the processor number of destination and transmitted data.

The contrivance for transmitting information from the processor element P(i, j, k), which is an originating processor element, to a processor element P(0, 0, 0), which is a distination processor element, in the three-dimensional example of FIG. 1 will now be described by referring to FIGS. 1, 3 and 4. First of all, the processing unit 2 of the originating processor P(i, j, k) inputs a communication packet into the communication control unit 3 and directs the communication control unit 3 to transmit the communication packet. The destination information (processor element number) of the communication packet includes three coordinates (0, 0, 0). Beginning with the first coordinate, the coordinate values (0, 0, 0) are successively compared with three coordinate values (i, j, k) included in its own processor element number, which is stored in the microprogram of the communication control unit 3. In order to communicate with a processor element P(o, j, k) having coordinates obtained by replacing the coordinate value of the first coordinate i, which has first caused noncoincidence, with 0, the first coordinate transforming crossbar switch 9-1 corresponding thereto is selected. The communication packet is placed in the output port register 6, and the number "1" of the selected crossbar switch 9-1 is inputted to the distributor via a signal line 12. By using this number "1", the distributor 8 connects a data line 13 and the control signal line 12 to one input channel 101 and 102 of the first coordinate transforming crossbar switch 9-1. By using the control signal line 12, the channel 101, the data line 13 and the channel 102, the communication control unit 3 sends the communication packet stored in the output port 6 to the first coordinate transforming crossbar switch 9-1. The structure and operation of the coordinate transforming crossbar switch will be described later.

In the processor element P(o, j, k) whereto the above described communication packet has been sent via the crossbar switch 9-1, its selector 7-2 selects the crossbar switch 9-1 out of a plurality of crossbar switches outputting a request to send signal OREQ which will be described later. (In the present invention, selection logic is not claimed.) Output channel lines 103 and 104 of the crossbar are thus connected to a control signal line 10-2 and a data line 11-2. The communication packet is taken into a communication control unit 3-2 via an input port register 5-2. At this time, the selector 7-2 conveys the number "1" of the sending crossbar switch 9-1 selected by the selection logic of the selector 7-2 as well via the control signal line 10-2. The communication control unit 3-2 of the processor elements P(o, j, k) knows the coordinate transformed from the above described switch number "1" such as the first coordinate in this example, compares the coordinate value (*, 0, 0) of the destination processor, where * represents the coordinate already transformed, with the coordinate value (o, j, k) of its own processor element successively beginning with the coordinate succeeding the already transformed coordinate, selects a second dimensional coordinate transforming crossbar switch 9-4 in order to transmit information to a processor element P(o, o, k) having coordinates obtained by replacing the second dimensional coordinate j, which has first caused noncoincidence, with 0, and sends out the communication packet to input channel lines 201 and 202. The processor element P(o, o, k), whereto the packet is inputted from output channel lines 203 and 204, can also perform relaying operation in the same way, send the packet to input channel lines 301 and 302 of a third-dimensional coordinate transforming crossbar switch 9-5, and forward the communication packet to the destination processor P(0, 0, 0) via output channel lines 303 and 304. In the destination processor element P(0, 0, 0), a communication control unit 3-4 decodes the destination of the packet (the processor element number) (0, 0, 0) stored into an input port 5-4 via a selector 7-4. Since the destination coincides with its own processor element number (0, 0, 0) stored in the microprogram, the communication control unit 3-4 notifies a processing unit 2-4 of arrival of the packet.

In a case of a general N-dimension interconnection scheme as well, it is possible to finally send information to a destination processor by thus relaying information in processor elements having coordinates obtained by successively replacing noncoincident coordinates with coordinates of the destination processor in coordinate transforming crossbar switches. Since transformation of noncoincident coordinates is completed in N attempts at most, the maximum length by number of coordinate transforming crossbar switches of the communication path of this interconnection scheme is N. In the three-dimensional example of FIG. 1, the maximum length of the communication path is 3. However, the lattice connection, the ring connection and the butterfly connection have communication performance equivalent to that of the full crossbar switch because a communication packet can be transferred to a destination processor in one transmission attempt without relaying operation.

Figure 4:
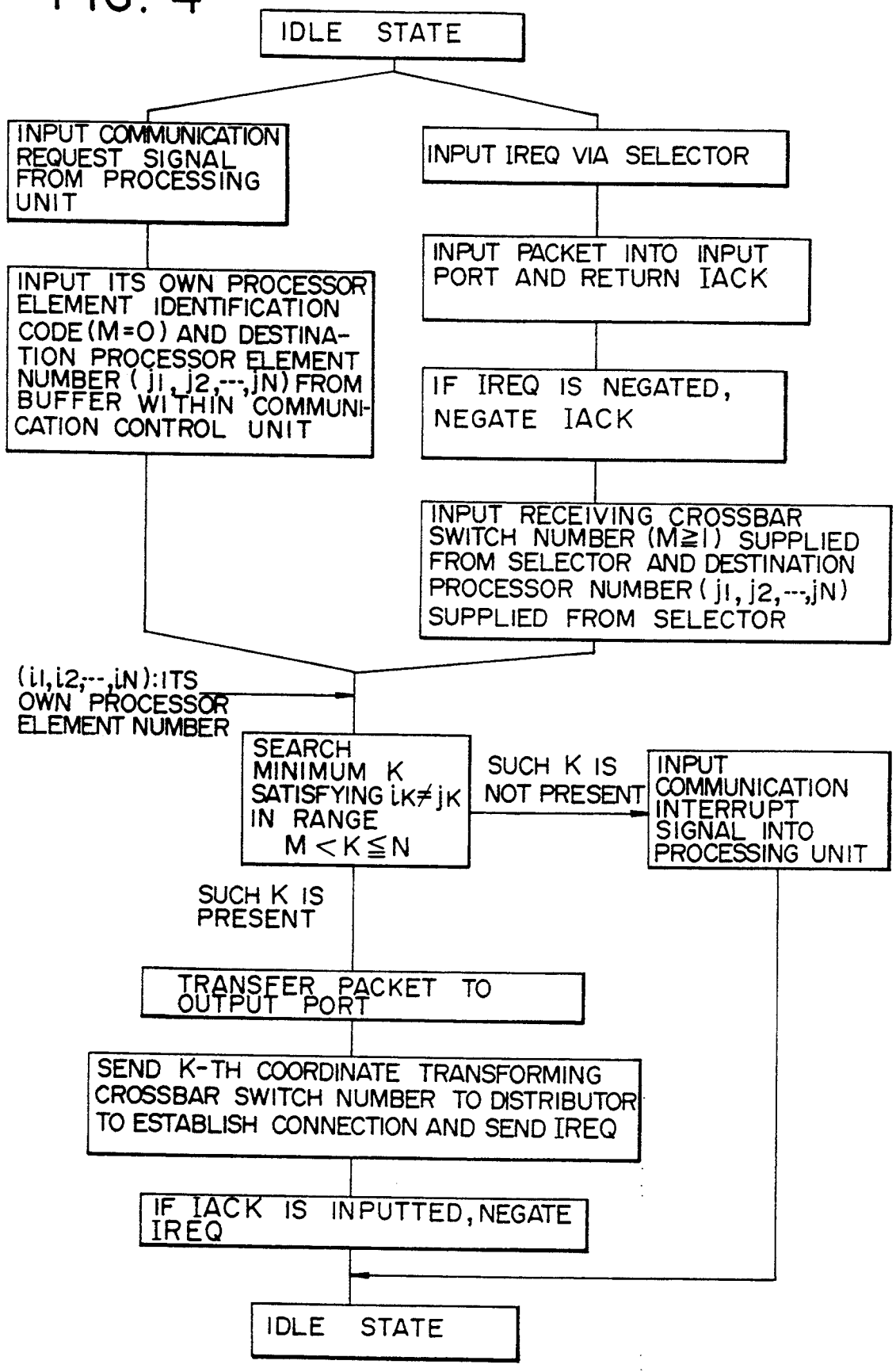
FIG. 4 is a flowchart showing the relaying operation of a communication control unit 3.

FIG. 4 shows the above described relaying operation logic of the communication control unit 3.

The structure and operation of the coordinate transforming crossbar switch will now be described.

Figure 5:
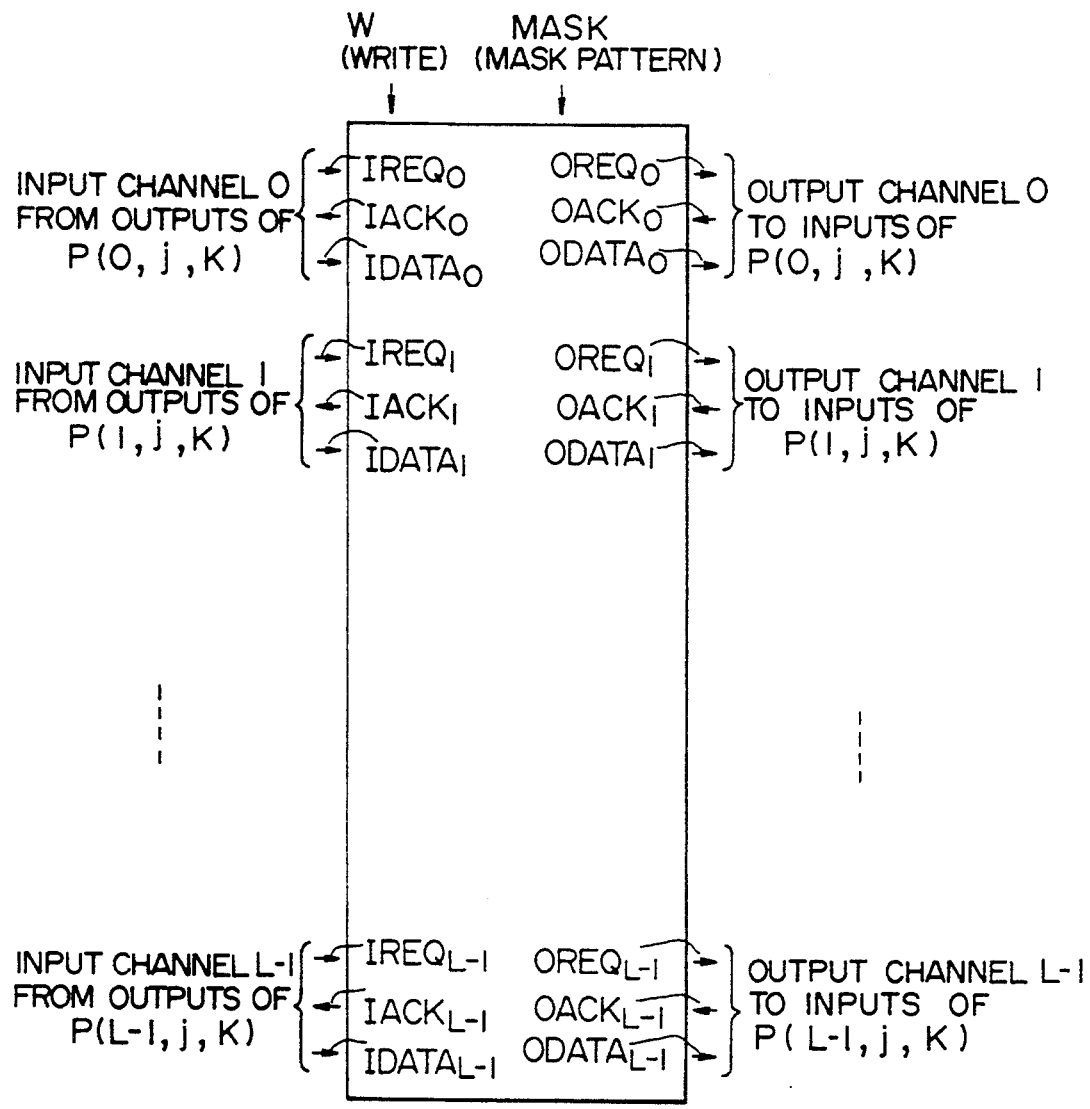
FIG. 5 is a diagram used for explaining the interface of a crossbar switch.

FIG. 5 shows the external interface of one crossbar switch 9 having L inputs and L outputs. One set of input channels comprise two control signal lines IREQ and IACK and a data line IDATA. The line IREQ is provided to carry a signal for notifying the crossbar switch that the processor element of the transmission side has stored data to be transmitted into the output port register 6 and is in the transmission waiting state. The line IACK is provided by carrying a signal supplied from the crossbar switch to notify the processor element that next transmitted data may be written into the output port register 6. The line IDATA carries transmitted data. In the same way, one set of output channels comprise two control signal lines OREQ and OACK and an output data line ODATA. The line OREQ is provided to carry a signal for the crossbar switch to request transfer of transmitted data into the input port register 5 of the processor element of the receiving side. The line OACK is provided to carry a signal to the crossbar switch notifying it that the processor element of the receiving side has completed the above described transfer of the transmitted data. The line ODATA carries the transmitted data. In the above described interface, the control signal lines IREQ and IACK are connected to the communication control unit 3 of the processor element via the distributor 8, and the control signal lines OREQ and OACK are connected to the communication control unit 3 of the processor element via the selector 7 as shown in FIG. 3. Further, the data line IDATA is connected to the output port register 6 of the processor element via the distributor 8, and the data line ODATA is connected to the input port register 5 of the processor element via the selector 7. The crossbar switch described in the present embodiment further comprises a mask register write control signal line W and a mask pattern signal line MASK for setting contents of a mask register (i.e., a mask pattern), which is used to mask the processor element number as described later. In case it suffices to fix the mask pattern at the time of fabrication, the mask pattern write control circuit is not required. The present invention includes such a configuration as well. Further, the mask register may then be replaced by a circuit for selecting a train of bits to be decoded.

Figure 6:
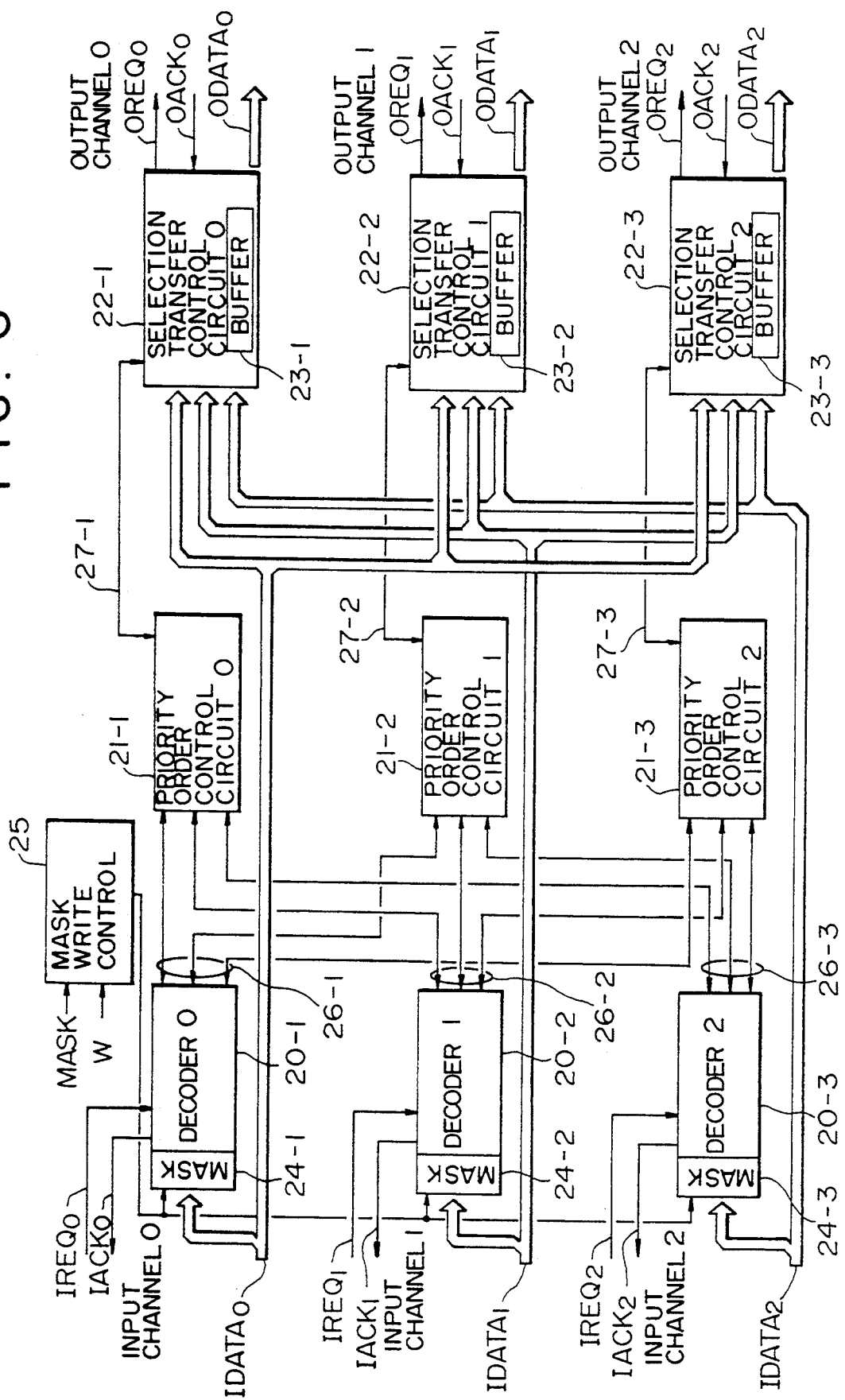
FIG. 6 is a configuration diagram of a crossbar switch.

FIG. 6 shows an example of the structure of a crossbar switch. In this example, a crossbar switch having 3 inputs and 3 outputs is used. However, a general crossbar switch having L inputs and L outputs is constructed in completely the same way. It is now assumed that a processor element P(2, j, k) having i=2 in FIG. 3 is going to perform transmission. The communication control unit 3 of the processor element P(2, j, k) stores the data to be transmitted into the output port register 6, and thereafter sends the number "1" of the crossbar switch to the distributor 8 to select a particular crossbar switch 9-1 and establish connection. The communication control unit 3 of the processor element P(2, j, k) outputs the request to send a signal on the control signal line 101 of the input channel 2, i.e., $IREQ_2$ via the signal line 12. That crossbar switch connects processor elements P(0, j, k), P(1, j, k) and P(2, j, k) by means of input and output channels 0, 1 and 2, respectively. When the request signal on the line $IREQ_2$ is inputted to a decoder 20-3 of the concerned crossbar switch, a portion, which corresponds to the first dimensional coordinate, of the destination processor element number in the transmitted information packet placed on the output port 6 is decoded. For the destination channel such as the channel (output channel 0) corresponding to the destination processor element P(0, 0, 0), "1" is outputted on a signal line 26-3. For other channels, "0" is outputted on the signal line 26-3. The "1" or "0" thus outputted is conveyed to all of priority order control circuits 21-1 to 21-3. Only a portion of a bit train of the decoded processor element number need be inputted to the decoder 20-3. Therefore, a processor element number has three fields each representing a coordinate of the three-dimensional lattice space. The coordinate transforming crossbar switch of each dimension must have a mechanism for taking out the one field corresponding to the destined dimension out of these fields. Ranges of coordinate values of respective dimensions are not generally equal to each other. Accordingly, positions and lengths of coordinate fields of respective dimensions are therefore not equal each other. In order for a field to be variably selected in the present embodiment, mask registers 24-1 to 24-3 are prepared in respective decoders, and a part of the processor element number is masked so that the remaining bit train may be decoded. However, the present invention can be applied to a case where the contents of the mask register are fixed at the time of fabrication and a variable configuration is not used, or a case where the mask register is simply replaced by a selection circuit of bit train to be decoded.

Figure 11:
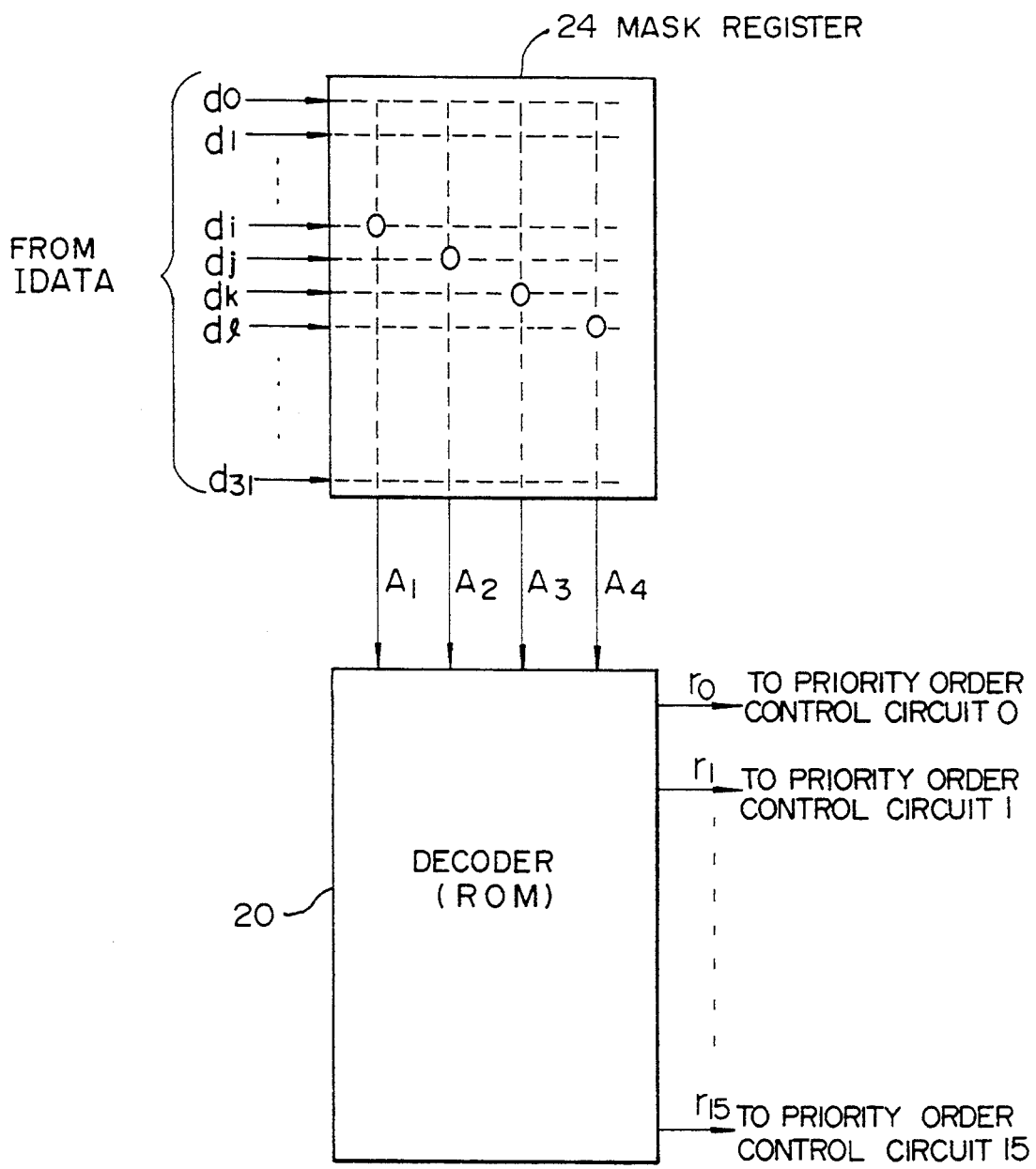
FIG. 11 is a diagram used for explaining a mask register.

FIG. 11 shows the function and configuration of a mask register. It is assumed that a 16×16 crossbar switch is used in FIG. 11. However, the mask register can be configured in the same way when a crossbar switch of a different size is used. The mask register 24 functioning as a kind of matrix switch selects a partial bit train $d_id_jd_kd_l$ representing the coordinate of a particular dimension out of a bit train $d_0, d_1, - - - d_{31}$, representing the destination processor element number included in IDATA and outputs the partial bit train as the input (address) $A_1A_2A_3A_4$ to a decoder (ROM) 20. This is achieved by writing "0" into fields corresponding to cross points of data lines $d_i, d_j, d_k$ and $d_l$ and output lines $A_1, A_2, A_3$ and $A_4$ and writing "1" into other fields. Each signal on the output lines $A_1, A_2, A_3$ and $A_4$ is decoded to a binary number comprising 4 bits representing a priority order control circuit number by the decoder 20 to be converted into one of request to send signals $r_0$ to $r_{15}$ which are sent to priority order control circuits 0 to 15. If contents of $d_id_jd_kd_l$ are "0000", for example, the contents are decoded into a signal "1000 - - - 0" so as to select the priority order control circuit 0. In case this switch is used as a crossbar switch having a smaller size than 16×16 such as a 4×4 crossbar switch, the mask register 24 selects only 2 bits and uses them as the input address $A_1A_2$ to the decoder ROM 20. In this case, however, only a part of the decoder ROM is used. The contents of the mask register 24-1 to 24-3 are set by a directive supplied from outside (such as a processor element or the host computer) to the mask register write control circuit 25 through the signal lines W and MASK or fixed at the time of fabrication together with the predetermined bit train selection circuit to be decoded.

Requests to send from input channels are conveyed to the priority order control circuit 21-1. As described later, one of those input channels is selected in accordance with predetermined logic. Thereafter, the priority order control circuit 21-1 confirms that a buffer 23-1 included in a selection transfer control circuit 22-1 is free and conveys the selected input channel number (channel 2) to the selection transfer control circuit 22-1 via a signal line 27-1. As a result, the transmitted information packet stored in the output port 6 of the processor elements P(2, j, k) is transferred to the buffer 23-1 included in the selection transfer control circuit 22-1 via the distributor 8 and the data line 102 of the input channel 2 (i.e., $IDATA_2$). During this operation, the priority order control circuit 21-1 is in the busy state, and starts the next selection operation when the transfer has been completed.

When all data have been transferred to the buffer 23-1, the selection transfer control circuit 22-1 outputs a request to send signal on a signal line $OREQ_0$ i.e., a control signal line 103 for requesting the destination processor element (processor element P(o, j, k)). Request to send signals from a plurality of coordinate transforming crossbar switches are inputted to the selector 7-2 of the processor element P(o, j, k). One of those request to send signals is selected in accordance with predetermined logic and conveyed to the communication control unit 3-2. If the input port register 5-2 is free, the communication control unit 3-2 writes the data which are present on a data line $ODATA_0$, i.e., on a data line 104, into an input port register 5-2 via the selector 7-2. When the writing operation has been completed, the communication control unit 3-2 outputs a write completion signal on a control signal line $OACK_0$. When the write completion signal from the line $OACK_0$ is inputted to the selection transfer control circuit 22-1, the selection transfer control circuit 22-1 negates the request to send signal existing on the line $OREQ_0$. The communication control unit 3-2 of the processor element P(o, j, k) senses this and negates a reception completion signal existing on the line $OACK_0$. The buffer 23-1 of the selection transfer control circuit 22-1 assumes a transfer ready state again, and the selector 7-2 of the processor element P(o, j, k) is also able to select another crossbar switch.

On the other hand, when the priority order control circuit 21-1 comes out from the busy state, the decoder 20-3 which has sensed this via the signal line 26-3 sends a transfer completion signal to the processor element P(2, j, k) via $IACK_2$. The communication control unit 3 of the processor element P(2, j, k) which has received the transfer completion signal existing on the $IACK_2$ negates the request to transfer signal existing on the $IREQ_2$, and it becomes possible to place next data to be transmitted on the output port 6.

Figure 7:
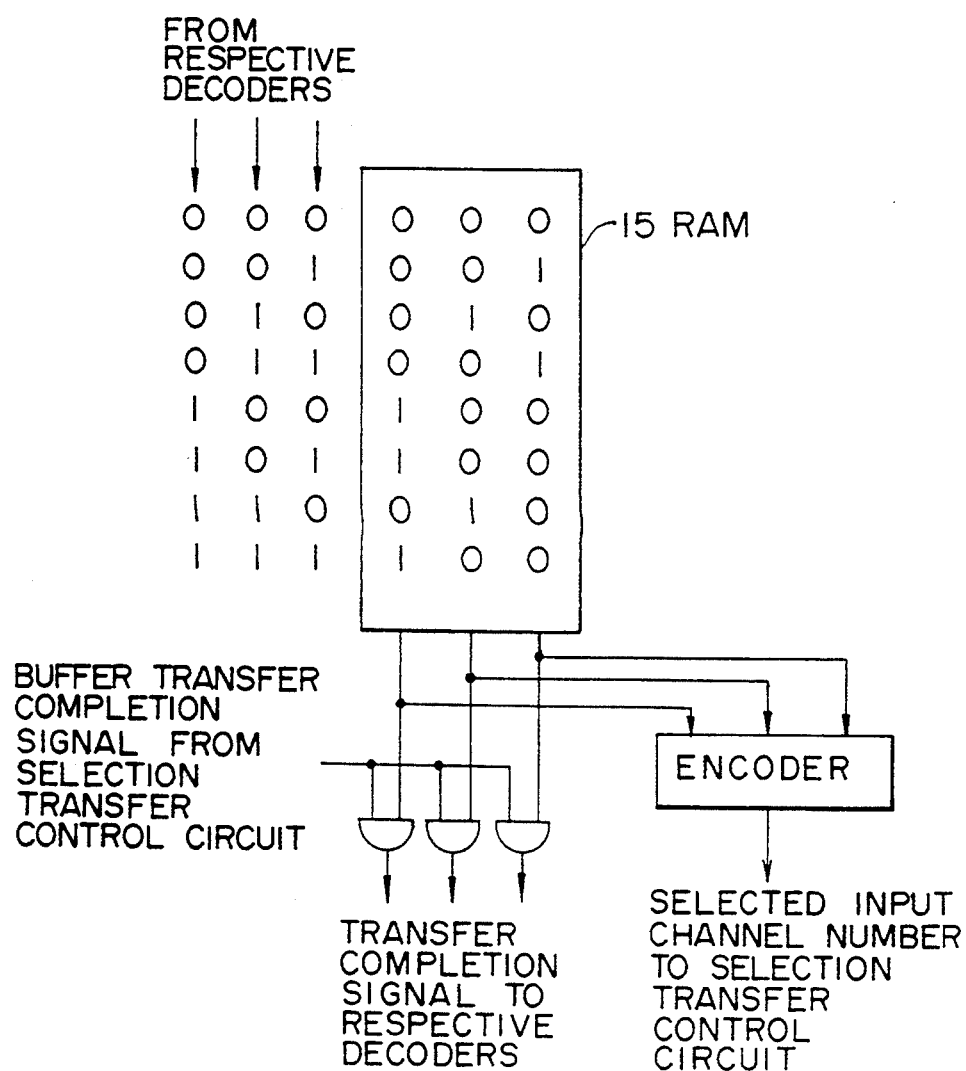
FIG. 7 is a diagram used for explaining an example of a priority order control circuit.

FIG. 7 shows an example of the logic of the priority order control circuits 21-1 to 21-3. Paying attention to the fact that inputs from three decoders comprise 3-bit information, i.e., 0 to 7 in this example, patterns of permission signals corresponding to respective inputs are memorized beforehand into a memory (RAM) 15 having 8 entries. However, logic of the priority order control circuit is not limited to this example.

Figure 8:
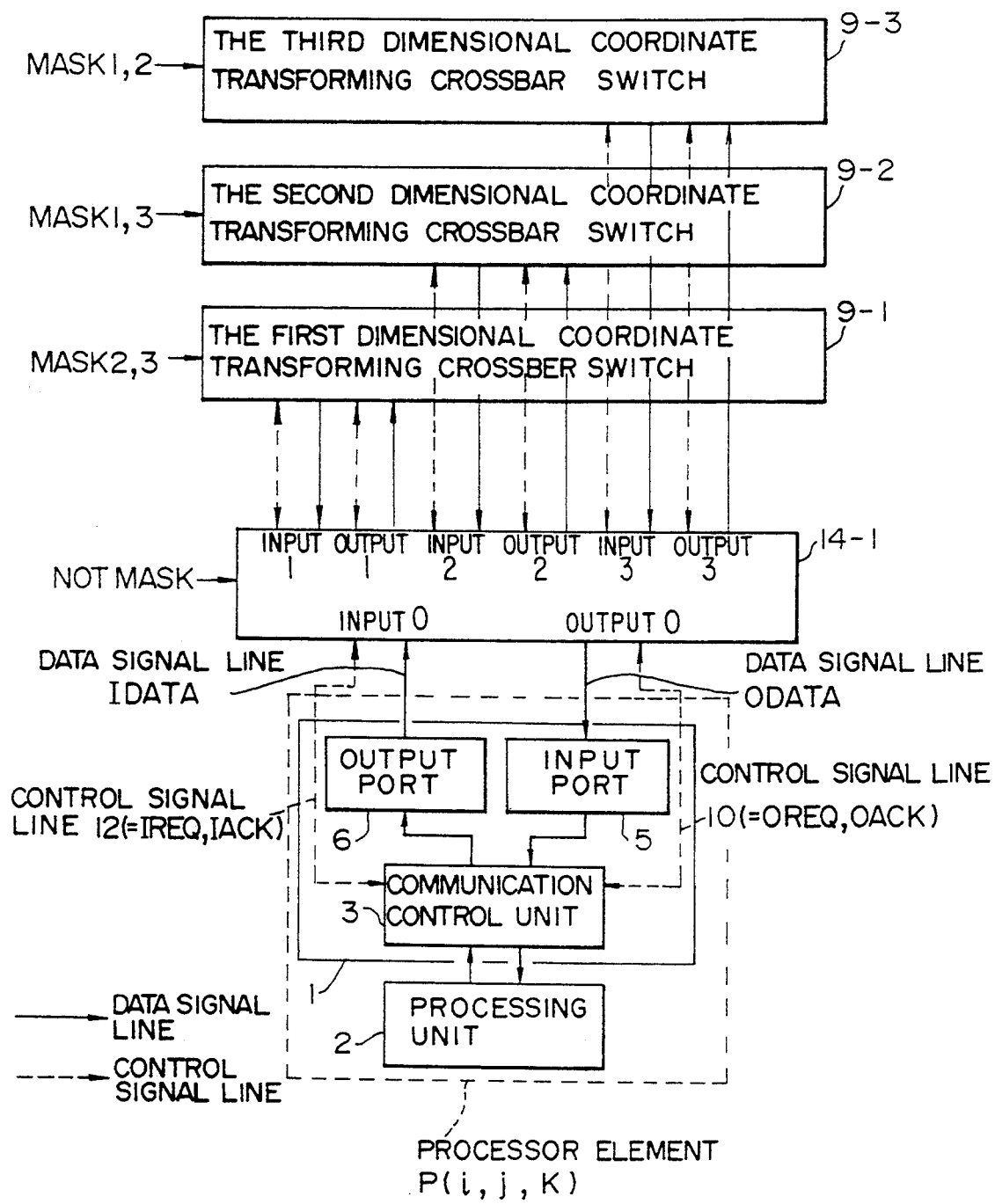
FIG. 8 is a configuration diagram of a second embodiment of the present invention.
Figure 9:
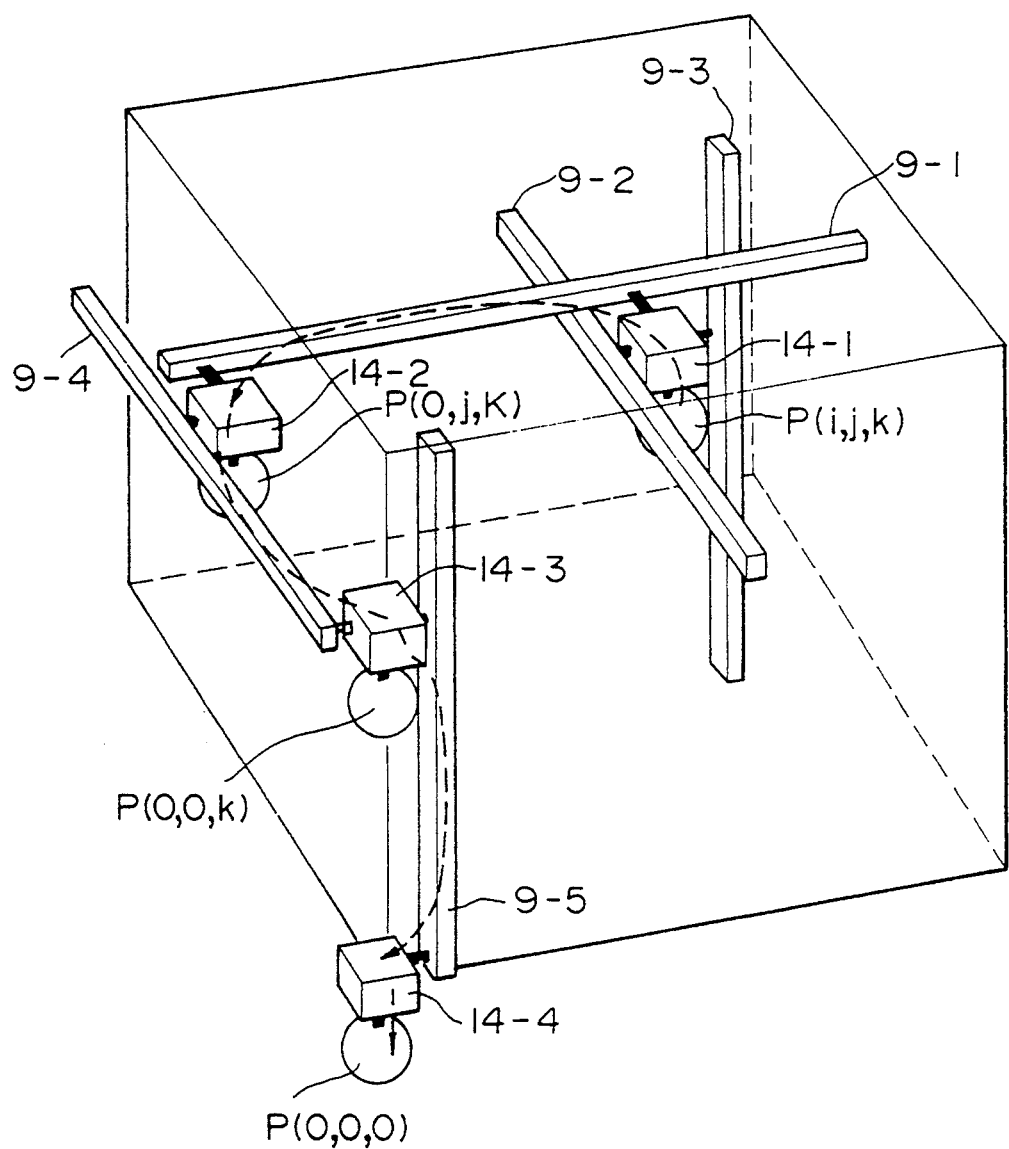
FIG. 9 is a diagram used for explaining the operation of the second embodiment.

FIGS. 8 and 9 schematically show the interconnection scheme of a second embodiment. The second embodiment differs from the first embodiment in that the relaying operation is not performed in the communication control unit 3 included in a processor element, but performed in a relaying crossbar switch 14 provided for each processor element.

First of all, the structure and operation of a relaying crossbar switch will now be described.

Figure 12:
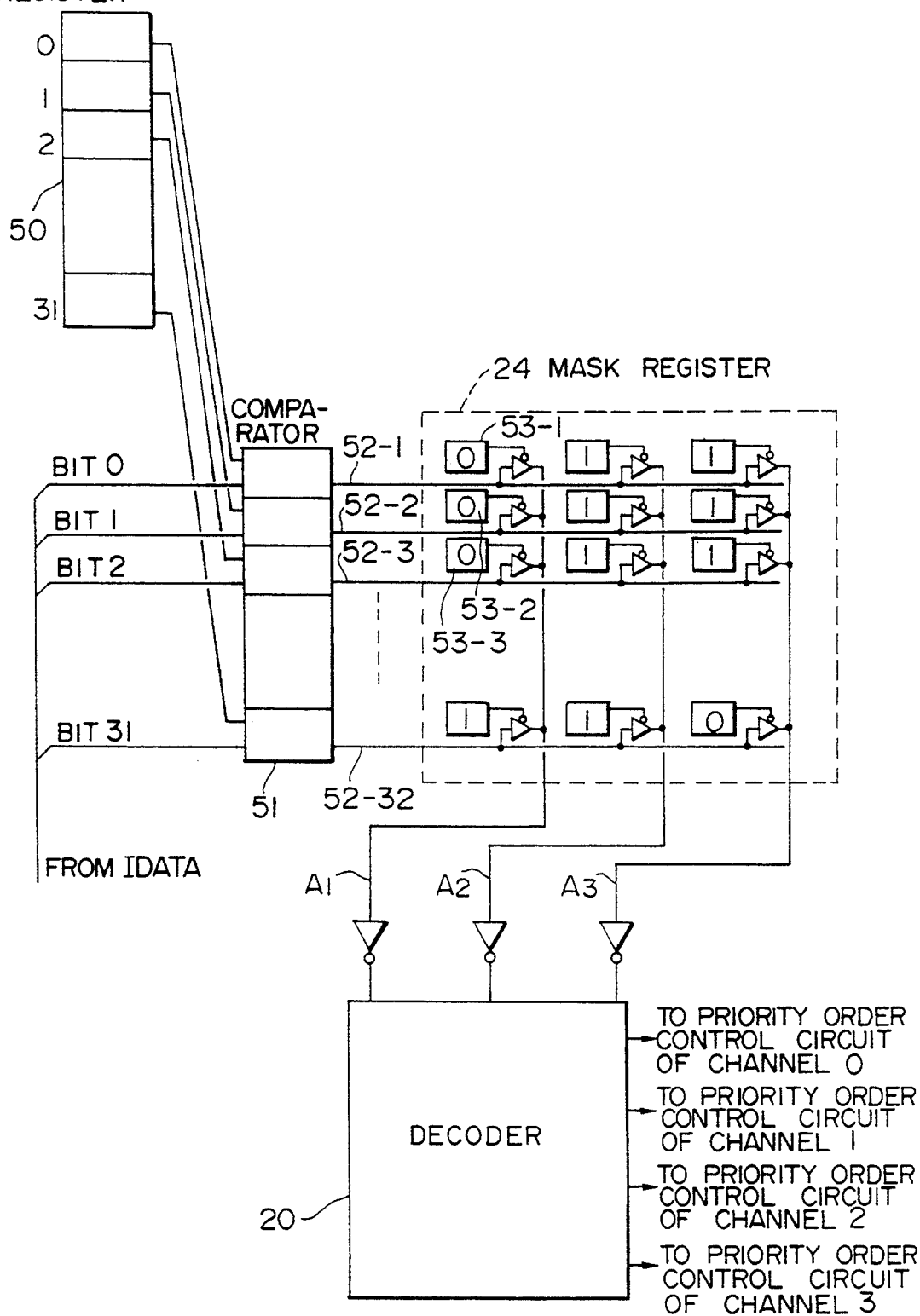
FIG. 12 is a diagram used for explaining a relaying crossbar switch.

The structure of the relaying crossbar switch is basically the same as that of the coordinate transforming crossbar switch. However, the destination processor element number inputted to the decoder is not one coordinate field but all of three coordinate fields. A destination decoder portion of the relaying crossbar switch will now be described in detail by referring to FIG. 12. The destination processor element number from the data line IDATA and contents of an its own processor element number register 50 provided in the relaying crossbar switch for storing its own processor element number are inputted to a comparator 51 to undergo exclusive OR operation bit by bit. In case of coincidence, a logic "1" is outputted on each of signal lines 52-1 to 52-32. In case of noncoincidence, a logic "0" is outputted on each of signal lines 52-1 to 52-32. These outputs are inputted to the mask register 24. If "0" is written on the crosspoint field of the mask register 24, i.e., if the input is not masked, the input is outputted on output line $A_1$, $A_2$ and $A_3$ as it is to undergo wired-AND operation there. Only when all outputs of the comparator, which are connected to an output line without being masked, are logic "1", therefore, a logic "1" is outputted to the output line. If the first to third coordinates of the processor element number are respectively assigned to the output lines $A_1$, $A_2$ and $A_3$, a logic "1" is outputted on an output line when the coordinate field is entirely equivalent to the corresponding field of its own processor element number. Otherwise (i.e., in case of a noncoincident coordinate), a logic "0" is outputted. Signals on the output lines are inverted and inputted to the decoder 20. For example, it is now assumed in FIG. 12 that the frist coordinate is represented by bits 0, 1 and 2 of the destination processor element number inputted from the data line IDATA. Those bits are inputted to the comparator 51 together with corresponding bits 0, 1 and 2 of the its own processor element number register 51. If all of those bits are mutually coincident, a logic "1" is outputted on each of signal lines 52-1, 52-2 and 52-3. A logic "0" is written beforehand in each of cross points 53-1, 53-2 and 53-3 of the first coordinate field and the first output line $A_1$ of the mask register, whereas a logic "1" is written beforehand in each of cross point fields of the first coordinate field and other output lines $A_2$ and $A_3$. Therefore, the result of comparison is sent to only the first output line $A_1$. Only when a logic "1" is outputted on each of the signal lines 52-1, 52-2 and 52-3, therefore, a logic "1" is outputted on the first output line $A_1$ of the mask register.

The decoder regards the signal on the output lines $A_1$, $A_2$ and $A_3$ as a binary address and decodes it into a channel number. The decoder sends a logic "1" to the priority order control circuit of that channel and sends logic "0"s to other priority order control circuits. If all of the signals on the output lines $A_1$, $A_2$ and $A_3$ are logic "1"s, i.e., the input address to the decoder obtained by inverting them is "000", for example, channel 0, i.e., the channel to its own processor element is selected.

The communication method will now be described. When a communication packet is inputted from one coordinate transforming crossbar switch 9 to a relaying crossbar switch 14 as shown in FIG. 8, its destination is decoded. If the destination is this processor element, the switch is connected to the input port 5 of the processor element to input the packet. If the destination is not this processor element, a coordinate transforming crossbar switch 9 for transforming the noncoincident coordinate is selected, and the relaying crossbar switch 14 is connected to the coordinate transforming crossbar switch 9 thus selected. The external interface of the relaying crossbar switch 14 is the same as that of the coordinate transforming crossbar switch 9.

In FIG. 9, an example in which a packet is transferred from the processor element P(i, j, k) to the processor element P(0, 0, 0) via relaying crossbar switches of processor elements P(0, j, k) and P(0, 0, k) is indicated by a broken line.

In the second embodiment, the communication control unit 3 is not equipped with function of decoding the destination information (destination processor element number) of a communication packet, selecting a particular coordinate transforming crossbar switch or a processing unit 2 on the basis of the decoded result, and sending the communication packet as described with respect to the first embodiment. In the second embodiment, the communication control unit has only function of simply interfacing with the relaying crossbar switch 14.

In the example of FIG. 9, the packet passes through three coordinate transforming crossbar switches (9-1, 9-4 and 9-5) and four relaying crossbar switches (14-1, 14-2, 14-3 and 14-4). Therefore, switching operation must be performed seven times in total. In the first embodiment, the number of passes through crosspoints is 3. That is to say, unit switching operation of transferring a communication packet from one input-output port/buffer to the next buffer/input-output port is repeated three times. If decision and selection processing in the control unit 3 of the processor element is considered, however, the time required for transfer becomes eventually identical. In the first embodiment in which processor elements themselves perform the relaying operation, the transmission operation must be performed N times at the maximum. Accordingly, the maximum communication path length of this switch is N. The amount of hardware represented in the number of cross points is $n_1 \times n_2 \times \cdots \times n_N \times (n_1+n_2+\cdots n_N)$. Further, the maximum value of $n_k^2$ ($k=1,\cdots,N$) is the maximum interconnection capability. In the second embodiment in which a relaying crossbar switch is provided for each processor element, the transmission operation must be performed $2N+1$ times at the maximum, if the relaying operation in the relaying crossbar switch 14 is regarded as one attempt of transmission operation. That is to say, the maximum communication path length of this switch is $2N+1$. Further, the amount of hardware is represented by $$n_1 \times n_2 \times \cdots \times n_N \times \{(N+1)^2 + n_1 + n_2 + \cdots n_N\}.$$

It will now be described that the interconnection scheme of the present invention facilitates derivation of configuration exhibiting the highest performance and configuration requiring the minimum amount of hardware when the maximum interconnection capability of one crossbar switch is given.

Assuming that the number of signal lines for connection between processor elements of a crossbar switch is constant, the performance depends upon the communication path length N or $2N+1$. That is to say, higher performance is obtained as the number of dimensions of a space in which processor elements are logically arranged is decreased as far as possible. In case processor elements perform relaying operation as shown in the first embodiment, the minimum communication path length when crossbar switches are used is represented as $$q = [\log L/\log n] + 1$$

where L is the number of processor elements and n is the maximum number of processor elements which can be connected by one crossbar switch. The symbol [] means an integer part of the quotient. In this configuration, processor elements are arranged in a hypercube region of a q or (q+1) dimensional lattice space, and all processor elements constituting the one dimensional part region among them are connected by using crossbar switches each of which is capable of connecting as many processor elements as the above described maximum value n.

Figure 10:
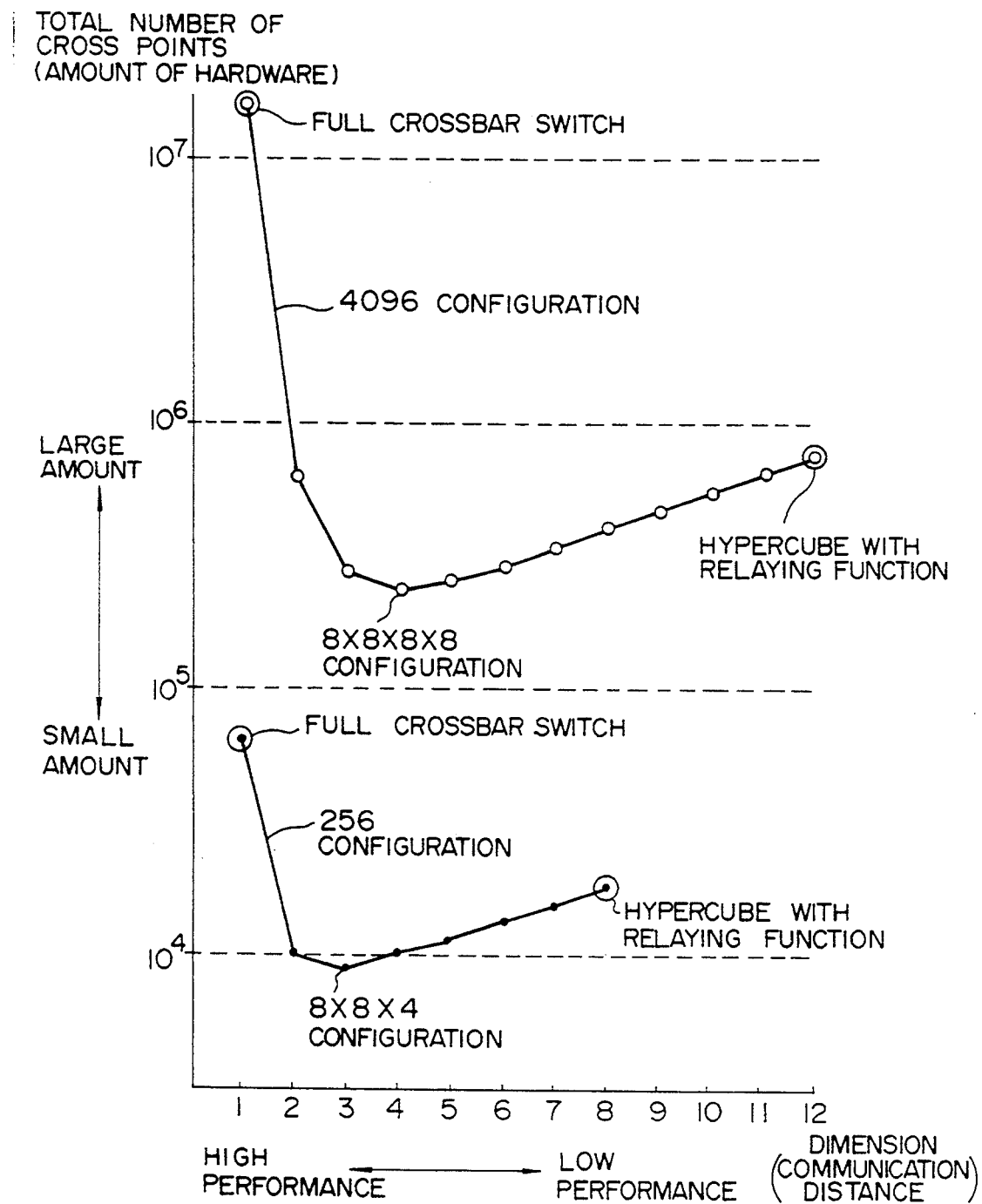
FIG. 10 is a diagram used for explaining the amount of hardware in case a relaying crossbar switch is included.

On the other hand, the amount of hardware becomes $n_1 \times n_2 \times \cdots \times n_N \times (n_1+n_2+\cdots+n_N)$. Therefore, it is evident that the minimum amount of hardware is obtained in case $n_i=2$. In the scheme using relaying crossbar switches as shown in the second embodiment, however, the amount of hardware becomes minimum when different configuration is adopted as shown in FIG. 10. In configuration of 256 processor elements, for example, the amount of hardware becomes minimum when three-dimensional arrangement of $8 \times 8 \times 4$ is used. In configuration of 4,096 processor elements, the amount of hardware becomes minimum when four-dimensional arrangement of $8 \times 8 \times 8 \times 8$ is used. If high performance is preferred even though the amount of hardware is large to some degree, two-dimensional configuration of $8 \times 8$ to $32 \times 32$ is suitable to configuration comprising 64 to 1,024 processor elements, and three-dimensional configuration of $4 \times 8 \times 8$ to $32 \times 32 \times 32$ is suitable to configuration comprising 2,048 to 32,768 processor elements.

The present invention makes it possible to construct a switch connecting a large number of processor elements, which cannot be connected by one crossbar switch (full crossbar switch), with interconnection capability close to that of the full crossbar switch regardless of the number of processor element. Interconnection capability close to that of the full crossbar switch means that the communication performance is high (the number of cross point passages is small), topology of connection between processor elements (lattice, ring and butterfly) which is important in application is contained, and communication can be performed with the minimum number of cross point passages for such a communication pattern between processor elements. In the range of the prior art, the hypercube is known as a network containing the above described interconnection topology and capable of a large number of processor elements. In the interconnection scheme of the present invention, however, the communication performance in a communication pattern other than the above described particular connection topology is far more excellent than that of the hypercube. In particular, deadlock can be completely prevented by using the relaying crossbar switches. Further, the present invention provides a method of configuring an optimum interconnection scheme (an interconnection scheme with the highest communication performance, the minimum amount of hardware, or a compromise between them) when the (technical and financial) upper limit of the coordinate transforming crossbar switch size (i.e., of the number of input and output channels of the crossbar switch) and the number of processor elements are arbitrarily given. It is thus possible to fill up a gap between the full crossbar switch and the hypercube.

Further, it is possible to define the interconnection relation of processor elements so that coordinate transforming switches of each dimension may be housed in each mounting unit such as chip, module, board or cubicle.

The present invention is applicable to a parallel computer disclosed in U.S. patent application entitled "Parallel computer having a processing request function" filed on Nov. 18, 1988, by Akira Muramatu, Ikuo Yoshiwara and Kazuo Nakao, assigned to the present asignee, based on Japanese Patent Application No. 62-289325.

We claim:

1. A computer implemented method for asynchronously selecting a communication interconnection path among a plurality of processor elements wherein each of the processor elements are identified by a coordinate set and wherein the processor elements are communicatively connected by a plurality of coordinate transforming crossbar switches, comprising steps of:

initiating an information transfer request for an information packet from a first processor element identified by a first coordinate set to a second processor element identified by a second coordinate set;

comparing by the first processor element of a first coordinate of the first coordinate set with a corresponding first coordinate of the second coordinate set, wherein the coordinate sets are comprised of a plurality of coordinates each having a preselected sequential priority for the comparing;

transferring the information packet from the first processor element to a first coordinate transforming crossbar switch selected for communicating the information packet among processor elements on a first coordinate dimensional basis comprising the first coordinate of the first coordinate set and inputting the information packet from the first coordinate transforming crossbar switch to a first selected processing element having a corresponding first coordinate equal to a first coordinate of the second coordinate set, when the comparing indicates that the first coordinates between the first coordinate set and the second coordinate set are different; and, sequentially comparing a next priority coordinate of the first selected processing element with a corresponding next priority coordinate of the second coordinate set, sequentially transferring the information packet to a corresponding next coordinate transforming crossbar switch for communicating among the processor elements on a next coordinate dimensional basis comprising a next coordinate of the first coordinate set, when the sequential comparing indicates that the next priority coordinates are different and sequentially inputting the information packet to a next selected processing element having a next priority coordinate equal to a next coordinate of the second coordinate set whereby the communication is complete when the next selected processing element is the second processing element.

2. The method as defined in claim 1 wherein the sequentially comparing comprises further comparing of an other next corresponding priority coordinate of the first selected processing element with an other corresponding next priority coordinate of the second coordinate set when the next priority coordinate and the corresponding next priority coordinate are the same.

3. A computer implemented system for asynchronously selecting a communication interconnection path among a plurality of processor elements wherein each of the processor elements are identified by a coordinate set and wherein the processor elements are communicatively connected by a plurality of coordinate transforming crossbar switches, comprising:

means for initiating an information transfer request for an information packet from a first processor element identified by a first coordinate set to a second processor element identified by a second coordinate set;

means for comparing in the first processor element of a first coordinate of the first coordinate set with a corresponding first coordinate of the second coordinate set, wherein the coordinate sets are comprised of a plurality of coordinates each having a preselected sequential priority for the comparing;

means for transferring the information packet from the first processor element to a first coordinate transforming crossbar switch selected for communicating the information packet among processor elements on a first coordinate dimensional basis comprising the first coordinate of the first coordinate set and inputting the information packet from the first coordinate transforming crossbar switch to a first selected processing element having a corresponding first coordinate equal to a first coordinate of the second coordinate set, when the comparing indicates that the first coordinates between the first coordinate set and the second coordinate set are different; and, means for sequentially comparing a next priority coordinate of the first selected processing element with a corresponding next priority coordinate of the second coordinate set, sequentially transferring the information packet to a corresponding next coordinate transforming crossbar switch for communicating among the processor elements on a next coordinate dimensional basis comprising a next coordinate of the first coordinate set, when the sequential comparing indicates that the next priority coordinates are different and sequentially inputting the information packet to a next selected processing element having a next priority coordinate equal to a next coordinate of the second coordinate set whereby the communication is complete when the next selected processing element is the second processing element.

4. The system as defined in claim 3 wherein the means for sequentially comparing further compares an other next corresponding priority coordinate of the first selected processing element with an other corresponding next priority coordinate of the second coordinate set when the next priority coordinate and the corresponding next priority coordinate are the same.

* * * * *